Patented Apr. 20, 1948

2,439,982

UNITED STATES PATENT OFFICE 2,439,982

PRODUCTION OF DEHYDRATED CASTOR OIL

George S. Monroe and Vladimir N. Ipatieff, Riverside, Ill., assignors to Universal Oil Products Company, Chicago, Ill., a corporation of Delaware No Drawing. Application July 30, 1943, Serial No. 496,778

8 Claims. (Cl. 260—405.5)

This invention relates to the treatment of castor oil to produce a modified oil having the properties of a drying oil.

One object of our invention comprises treating castor oil to effect its dehydration to a drying oil which may be used alone or in admixture with other natural or synthetic drying oils, in the manufacture of paints, varnishes or other coating materials and in the preparation of synthetic resins.

The dehydration of castor oil involves the splitting of water from the ricinoleic acid groups of the triglyceryl ester which comprises the principal constituent of said oil. In addition to the introduction of new double bonds into the glyceride of ricinoleic acid, it is also desired to effect conjugation of the double bonds simultaneously with the dehydration, as it is known that the drying speed of oils is dependent upon the proportion of conjugated systems of double bonds in the oil molecule. As used here the term "dehydration" does not refer to the mere removal of water which may be present in the castor oil undergoing treatment, but is concerned solely with the removal of hydroxyl groups together with an adjoining hydrogen atom in the form of water from ricinoleic acid or its triglyceride, and in so doing, introducing a second double bond into the acid molecule.

It is recognized that the catalytic dehydration of castor oil has been known for some time. Among the catalysts heretofore used for dehydrating the castor oil are acid compounds of mineral acids such as phosphoric acid, sulfuric acid, sulfonic acids of aromatic hydrocarbons, or the aforementioned acids themselves. In contrast to these catalysts, the catalyst employed in the present process comprises a very dilute aqueous solution of a mineral acid or a dilute aqueous solution of an easily hydrolyzable metal salt which can be mixed easily with the castor oil to be dehydrated.

Broadly, our invention comprises treating castor oil at a dehydrating temperature in the presence of a ctalyst comprising a dilute aqueous solution of a strong acid or salt of the same which undergoes hydrolysis in aqueous solutions to effect dehydration of the ricinoleic acid groups in said oil to octadecadienoic acid.

In one specific embodiment the present invention relates to a process for the dehydration of castor oil which comprises subjecting said oil under dehydrating conditions to the action of a dilute aqueous solution of a mineral acid catalyst.

In another embodiment, this invention relates to a process for producing dehydrated castor oil which comprises subjecting said oil under dehydrating conditions to the action of a dilute aqueous solution of a hydrolyzable salt.

Catalysts which are suitable for use in the process of the present invention comprise aqueous solutions of mineral acids. Suitable mineral acids include hydrochloric, hydrobromic, arsenic, sulfuric and orthophosphoric acids and other phosphoric acids which may be introduced as such or formed in situ by hydrolysis of a salt. Suitable hydrolyzable salts include Friedel-Crafts type halides, a sulfate of iron, zinc or aluminum or a halide or sulfate of magnesium, while some other readily hydrolyzable salts which may be employed comprise halides or sulfates of copper, manganese, nickel, cobalt, etc. Ammonium salts may also be employed. The different mineral acids and salts mentioned above are not necessarily equivalent in activity as catalysts for the dehydration of castor oil. The weight ratio of castor oil to the dilute solution containing the catalyst will generally be approximately 1 to 1 but smaller or larger proportions of these materials may also be utilized.

The dehydration of castor oil in the presence of the catalyst herein described may be carried out in either batch or continuous type of operation. In batch type operation the desired proportion of castor oil and dilute aqueous solution of a mineral acid or easily hydrolyzable salt are charged to an autoclave, or other suitable reaction vessel, in which the reactants may be contacted under pressure for a time sufficient to effect dehydration of the triglyceride of the ricinoleic acid present in the oil. The resultant reaction mixture is separated into dehydrated castor oil, unconverted oil, and an aqueous solution containing the catalyst. The unconverted oil recovered and aqueous solution containing the acid or salt may be utilized further in a later run.

Alternatively the production of dehydrated oil may be made continuous by passing castor oil and a dilute aqueous solution of a mineral acid or easily hydrolyzable metal salt through a reactor maintained at a temperature of from about 225° C. to about 300° C. and generally under a pressure from about atmospheric to about 65 atmospheres. By this process the castor oil is treated with aqueous solutions containing less than about 5 per cent by weight, but generally from about 1 to about 2 per cent by weight of mineral acid catalyst or hydrolyzable salt. The dehydrated oil produced as hereinabove set forth may be removed from the reaction mixture by distillation and the unconverted oil may be reprocessed. When hydrolyzable salts are employed, without added water, relatively little dehydration of the castor oil occurs. It is quite unexpected that a dehydration reaction can thus be effected in the presence of a large amount of water and of a relatively small amount of a catalyst as herein described.

The following examples are given to illustrate the nature of the results obtained by the use of the present process, but the examples are not introduced with the intention of unduly limiting the invention in accordance with the data submitted.

*Example I*

135 grams of castor oil were added to a rotating autoclave equipped with a closed glass liner having a capillary vent in the closure. The oil was treated with a dilute solution of ammonium chloride having 2.7 grams of ammonium chloride in 135 grams of water. The reaction temperature was maintained at 250° C. and the pressure at 18 atmospheres. The dehydrated oil had the following properties:

| | |
|---|---|
| Viscosity at 77° F., poises | 2.25 |
| Acetyl number | 78 |
| Saponification number | 188 |
| Percent dehydration (by acetyl number) | 47.5 |

*Example II*

98.5 grams of castor oil were treated in a rotating autoclave equipped with a closed glass liner having a capillary vent in the closure. The oil was treated with 1.8 grams of ammonium chloride dissolved in 90 grams of water. The mixture was maintained at a temperature of 275° C. and at a pressure of 40 atmospheres for a processing period of 2 hours. The dehydrated oil had the following properties:

| | |
|---|---|
| Viscosity at 77° F., poises | 1.96 |
| Acetyl number | 15.2 |
| Saponification number | 187 |
| Percent dehydration (by acetyl number) | 89.5 |

*Example III*

90 grams of castor oil were treated with a solution of ammonium chloride of the same strength as in Example II and in the same apparatus. The dehydrating temperature was maintained at 300° C. and the pressure at 60 atmospheres. The dehydrated oil had the following properties:

| | |
|---|---|
| Viscosity at 77° F., poises | 4.55 |
| Acetyl number | 16 |
| Saponification number | 168 |
| Percent dehydration (by acetyl number) | 89.2 |

We claim as our invention:

1. A process for dehydrating castor oil which comprises contacting castor oil at a dehydrating temperature and superatmospheric pressure with a liquid catalyst consisting of an aqueous solution containing at least 1 weight percent but less than 5 weight percent of an acidic substance selected from the group consisting of the mineral acids and hydrolyzable salts of mineral acids.

2. A process for dehydrating castor oil which comprises contacting castor oil at a dehydrating temperature and superatmospheric pressure with a liquid catalyst consisting of an aqueous solution containing at least 1 weight percent but less than 5 weight percent of a mineral acid.

3. A process for dehydrating castor oil which comprises contacting castor oil at a dehydrating temperature and superatmospheric pressure with a liquid catalyst consisting of an aqueous solution containing at least 1 weight percent but less than 5 weight percent of a hydrolyzable salt of a mineral acid.

4. A process for dehydrating castor oil which comprises contacting castor oil at a dehydrating temperature and superatmospheric pressure with a liquid catalyst consisting of an aqueous solution containing at least 1 weight percent but less than 5 weight percent of ammonium chloride.

5. A process of dehydrating castor oil which comprises contacting castor oil at a temperature of from about 225° C. to about 300° C. and superatmospheric pressure with a liquid catalyst consisting of an aqueous solution containing at least 1 weight percent but less than 5 weight percent of an acidic substance selected from the group consisting of the mineral acids and hydrolyzable salts of mineral acids.

6. A process for dehydrating castor oil which comprises contacting castor oil at a temperature of from about 225° C. to about 300° C. and superatmospheric pressure with a liquid catalyst consisting of an aqueous solution containing from about 1 to about 2 weight percent of an acidic substance selected from the group consisting of the mineral acids and hydrolyzable salts of mineral acids.

7. A process for dehydrating castor oil which comprises contacting castor oil at a dehydrating temperature and superatmospheric pressure with a liquid catalyst consisting of an aqueous solution of an acidic substance selected from the group consisting of the mineral acids and hydrolyzable salts of mineral acids, said solution containing at least 1 weight percent but less than 5 weight percent of said acidic substance, and separating from the reaction mixture dehydrated castor oil and said aqueous solution.

8. The process of claim 7 further characterized in that the aqueous catalyst solution separated from the reaction mixture is returned to the process for reuse.

GEORGE S. MONROE.
VLADIMIR N. IPATIEFF.

REFERENCES CITED

The following references are of record in the file of this patent:

UNITED STATES PATENTS

| Number | Name | Date |
|---|---|---|
| 1,774,324 | Gray | Aug. 26, 1930 |
| 1,892,258 | Ufer | Dec. 27, 1932 |
| 2,230,549 | Sorensen | Feb. 4, 1941 |
| 2,290,165 | Cherry | July 21, 1942 |
| 2,317,362 | Colbeth | Apr. 27, 1943 |

FOREIGN PATENTS

| Number | Country | Date |
|---|---|---|
| 520,508 | Great Britain | Apr. 25, 1940 |

OTHER REFERENCES

Industrial Eng. Chem. pages 555–8 (April 1940).
Paint Manuf. pages 166–70 (Aug. 1941).